(12) United States Patent
Uefune et al.

(10) Patent No.: US 10,997,998 B1
(45) Date of Patent: May 4, 2021

(54) TAPE EMBEDDED DRIVE WITH TIED SPINDLE STRUCTURE

(71) Applicant: Western Digital Technologies, Inc., San Jose, CA (US)

(72) Inventors: Kouki Uefune, Kanagawa (JP); Toshio Takahashi, Tokyo (JP); Takako Hayakawa, Kanagawa (JP); Yuichi Arai, Kanagawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/910,512

(22) Filed: Jun. 24, 2020

(51) Int. Cl.
| | |
|---|---|
| *G11B 15/28* | (2006.01) |
| *G11B 15/32* | (2006.01) |
| *G11B 33/12* | (2006.01) |
| *G11B 33/04* | (2006.01) |
| *G11B 5/48* | (2006.01) |

(52) U.S. Cl.
CPC ........... *G11B 15/28* (2013.01); *G11B 5/4893* (2013.01); *G11B 15/32* (2013.01); *G11B 33/04* (2013.01); *G11B 33/124* (2013.01)

(58) Field of Classification Search
CPC ....... G11B 15/28; G11B 5/4893; G11B 15/32; G11B 33/04; G11B 33/124
USPC ...................................................... 360/96.51
See application file for complete search history.

(56) References Cited

U.S. PATENT DOCUMENTS

| | | | | |
|---|---|---|---|---|
| 2,578,221 A | * | 12/1951 | Bodmer | B23G 1/04 470/176 |
| 3,168,232 A | | 2/1965 | Beaver | |
| 3,176,927 A | * | 4/1965 | Irazoqui | G11B 15/56 434/113 |
| 3,667,701 A | * | 6/1972 | Blum | G11B 15/43 242/335 |
| 3,692,956 A | | 9/1972 | Northrup | |
| 3,987,980 A | * | 10/1976 | Sperry | G11B 15/32 242/335 |
| 4,009,846 A | | 3/1977 | Coruzzi | |
| 4,080,638 A | | 3/1978 | Platt | |
| 4,266,255 A | | 5/1981 | Camras | |
| 4,303,210 A | | 12/1981 | Fujita et al. | |
| 4,562,497 A | | 12/1985 | Morinaga et al. | |

(Continued)

FOREIGN PATENT DOCUMENTS

| | | |
|---|---|---|
| CA | 1257387 A | 7/1989 |
| JP | H10-241340 A | 9/1998 |

OTHER PUBLICATIONS

Related U.S. Appl. No. 16/365,034, filed Mar. 26, 2019.
(Continued)

*Primary Examiner* — Allen T Cao
(74) *Attorney, Agent, or Firm* — Patterson & Sheridan, LLP; Steven H. Versteeg

(57) ABSTRACT

The present disclosure generally relates to a tape embedded drive having the spindles upon which the tape reels are disposed, fixedly coupled at both the bottom and the top to ensure stability of the reels. Furthermore, an additional cover over the spindle can be used to secure the top coupling mechanism and the spindle to the tape embedded drive enclosure to provide additional stability. A sealing cover is then placed over the additional cover to tightly seal the enclosure.

20 Claims, 6 Drawing Sheets

(56) References Cited

U.S. PATENT DOCUMENTS

| | | | | |
|---|---|---|---|---|
| 4,575,022 | A * | 3/1986 | Allwine, Jr. | G11B 15/67 |
| | | | | 242/352.4 |
| 5,055,947 | A * | 10/1991 | Satoh | H04M 1/642 |
| | | | | 360/62 |
| 5,543,992 | A * | 8/1996 | Hu | G11B 23/08778 |
| | | | | 360/132 |
| 5,881,960 | A | 3/1999 | Christie | |
| 5,883,771 | A | 3/1999 | Hoerger | |
| 6,163,432 | A * | 12/2000 | Van Den Dungen | |
| | | | | G11B 15/602 |
| | | | | 226/21 |
| 6,466,400 | B1 * | 10/2002 | Iwahara | G11B 17/0287 |
| | | | | 360/265.6 |
| 9,824,715 | B2 | 11/2017 | Vanderheyden | |
| 9,892,751 | B1 | 2/2018 | Harper | |
| 2004/0004789 | A1 * | 1/2004 | Watanabe | G11B 23/08714 |
| | | | | 360/132 |
| 2007/0008683 | A1 | 1/2007 | Gavit et al. | |
| 2007/0236827 | A1 * | 10/2007 | Eaton | G11B 15/602 |
| | | | | 360/93 |
| 2008/0198506 | A1 | 8/2008 | Weng et al. | |
| 2009/0316299 | A1 * | 12/2009 | Tashiro | G11B 33/1466 |
| | | | | 360/97.12 |
| 2012/0206832 | A1 | 8/2012 | Hamidi et al. | |
| 2013/0019465 | A1 | 1/2013 | Childers et al. | |
| 2013/0050872 | A1 * | 2/2013 | Sekii | H02K 5/22 |
| | | | | 360/99.08 |
| 2015/0310881 | A1 * | 10/2015 | Koui | G11B 5/314 |
| | | | | 360/235.4 |
| 2016/0104515 | A1 * | 4/2016 | Strange | G11B 33/027 |
| | | | | 360/99.18 |

OTHER PUBLICATIONS

Lenovo, "IBM LTO Ultrium Tape Drives for Lenovo"; https://lenovopress.com/tips1305.pdf, (17 pages).

Tape Drives and Media, LTO Drive Requirements and Compatibility; https://qsupport.quantum.com/kb/flare/content/Scalar_i6000/docCenter/, 2020, (2 pages).

* cited by examiner

TAPE EMBEDDED DRIVE WITH TIED SPINDLE STRUCTURE

BACKGROUND OF THE DISCLOSURE

Field of the Disclosure

Embodiments of the present disclosure generally relate to securing a tape embedded drive.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head comprises servo elements and data elements that are arranged in an array that is oftentimes referred to as a tape head array.

In operation, the tape drive system has many moving parts such as a tape that moves between two reels. In between the two reels, the tape rolls over numerous rollers guiding the tape to a reading or writing position in front of the head. Individually, the moving parts are of little significance, but collectively, the numerous moving parts can create quite a significant movement of the tape drive, such as shock and vibration of the tape drive, which creates an unstable tape drive.

Therefore, there is a need in the art for an improved tape drive that has improved stability.

SUMMARY OF THE DISCLOSURE

The present disclosure generally relates to a tape embedded drive having the spindles upon which the tape reels are disposed, fixedly coupled at both the bottom and the top to ensure stability of the reels. Furthermore, an additional cover over the spindle can be used to secure the top coupling mechanism and the spindle to the tape embedded drive enclosure to provide additional stability. A sealing cover is then placed over the additional cover to tightly seal the enclosure.

In one embodiment, a data storage device comprises: an enclosure, the enclosure comprising a first top cover, a base, a first wall, a second wall, a third wall connecting the first wall and the second wall, and a fourth wall connecting the first wall and the second wall, wherein the first wall, the second wall, the third wall, and the fourth wall are all coupled to the first top cover and the base; a first spindle shaft, wherein the first spindle shaft is fixedly coupled to the base and to the first top cover; a first tape reel for unwinding tape media for storing data, wherein the first tape reel is disposed on the first spindle shaft; a head assembly for reading data from and writing data to the tape media, wherein the head assembly is disposed within the enclosure; and a plurality of guide rollers.

In another embodiment, a data storage device comprises: an enclosure, the enclosure comprising a first top cover, a second top cover, a base, a first wall, a second wall, and a third wall connecting the first wall and the second wall, wherein at least two walls of the first wall, the second wall, and the third wall are coupled to the first top cover, the second top cover, and the base, wherein the second top cover is spaced from the first top cover by a first distance at a first location and by a second distance at a second location, wherein the second distance is greater than the first distance; a first spindle shaft, wherein the first spindle shaft is fixedly coupled to the base; a first tape reel for unwinding tape media for storing data, wherein the first tape reel is disposed on the first spindle shaft; a head assembly for reading data from and writing data to the tape media, wherein the head assembly is disposed within the enclosure; and a plurality of guide rollers.

In another embodiment, a data storage device comprises: an enclosure, the enclosure having a first top cover, a second top cover, a base, a first wall, a second wall, and a third wall connecting the first wall and the second wall, wherein the first wall, the second wall, and the third wall are all coupled to the first top cover, the second top cover, and the base, wherein the second top cover is spaced from the first top cover by a first distance at a first location and by a second distance at a second location, wherein the second distance is greater than the first distance; a first spindle shaft, wherein the first spindle shaft is fixedly coupled to the base and the first top cover; a first tape reel for unwinding tape media for storing data, wherein the first tape reel is disposed on the first spindle shaft; a head assembly for reading data from and writing data to the tape media, wherein the head assembly is disposed within the enclosure; and a plurality of guide rollers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape embedded drive having the spindles upon which the tape reels are disposed, fixedly coupled at both the bottom and the top to ensure stability of the reels. Furthermore, an additional cover over the spindle can be used to secure the top coupling mechanism and the spindle to the tape embedded drive enclosure to provide additional stability. A sealing cover is then placed over the additional cover to tightly seal the enclosure.

Figure 1A:
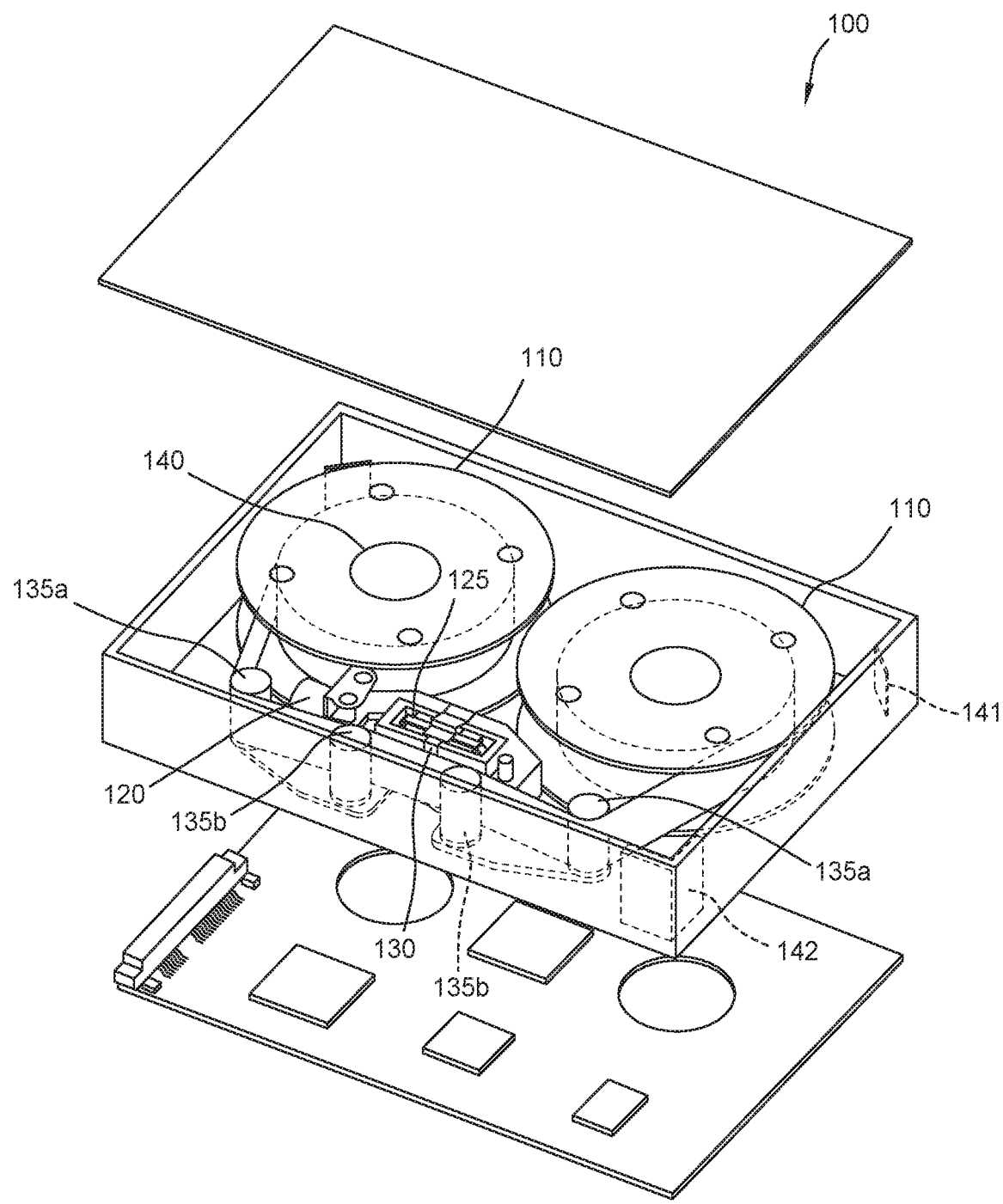
FIGS. 1A-1C illustrate a perspective exploded view and a simplified top down and side profile view of a tape embedded drive, in accordance with some embodiments.
Figure 1B:
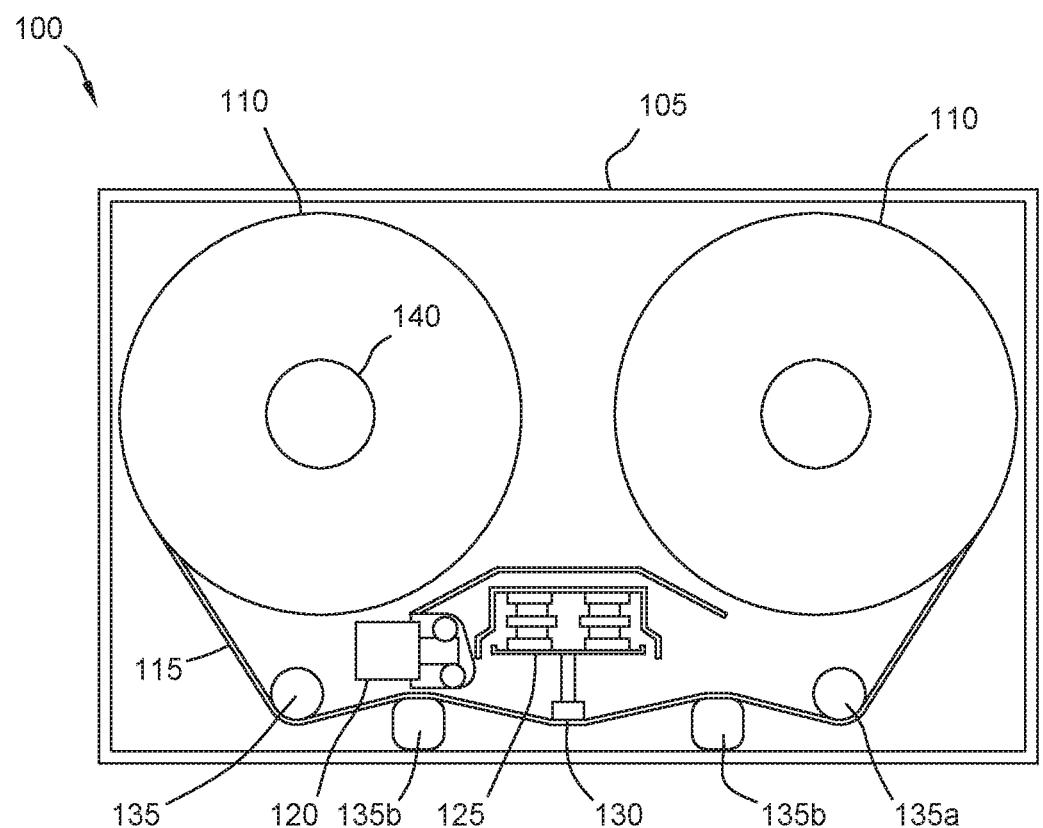
Figure 1C:
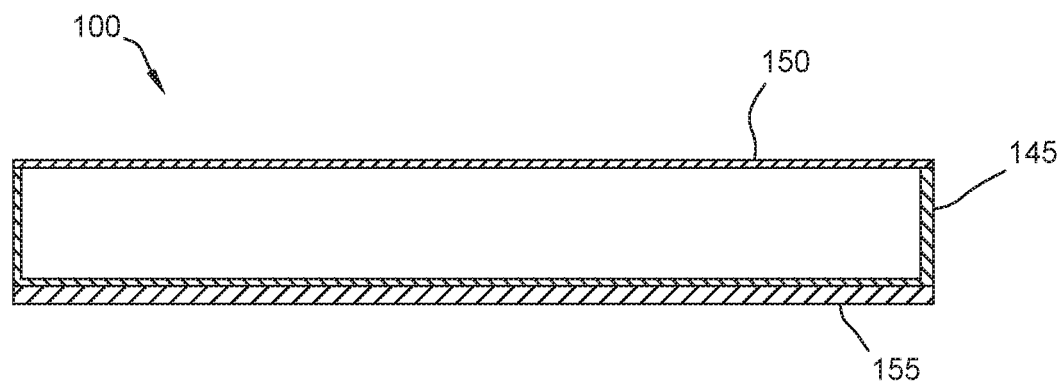

FIGS. 1A-1C illustrate a perspective exploded view and a simplified top down and side profile view of a tape embedded drive, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprise one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
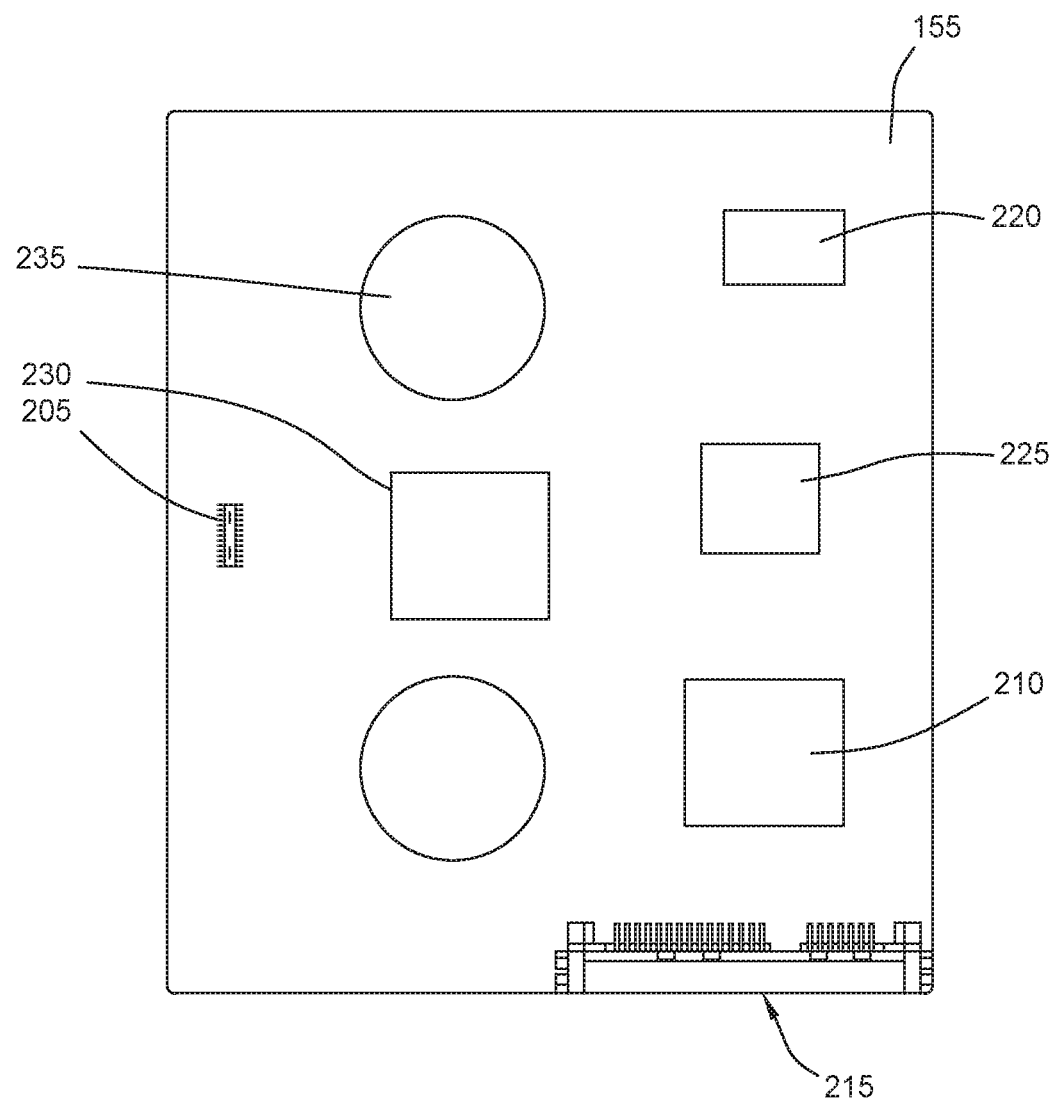
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

While the above discusses the tape embedded drive 100 as having a casing with a 3.5 inch form factor like that of HDDs, the tape embedded drive 100 may use other form factors. For example, if tape technology become sufficiently miniaturized in the future, then the tape embedded drive could use a 2.5 inch drive form factor, like that used by laptop HDDs. In some embodiments, where larger sizes are desired, the tape embedded drive 100 may use a 5.25 inch drive form factor for the casing, such as those used by computer CD-ROMs. Furthermore, the tape embedded drive 100 may use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch drive form factor based infrastructure found in various computer equipment, such as racks and servers.

Figure 3:
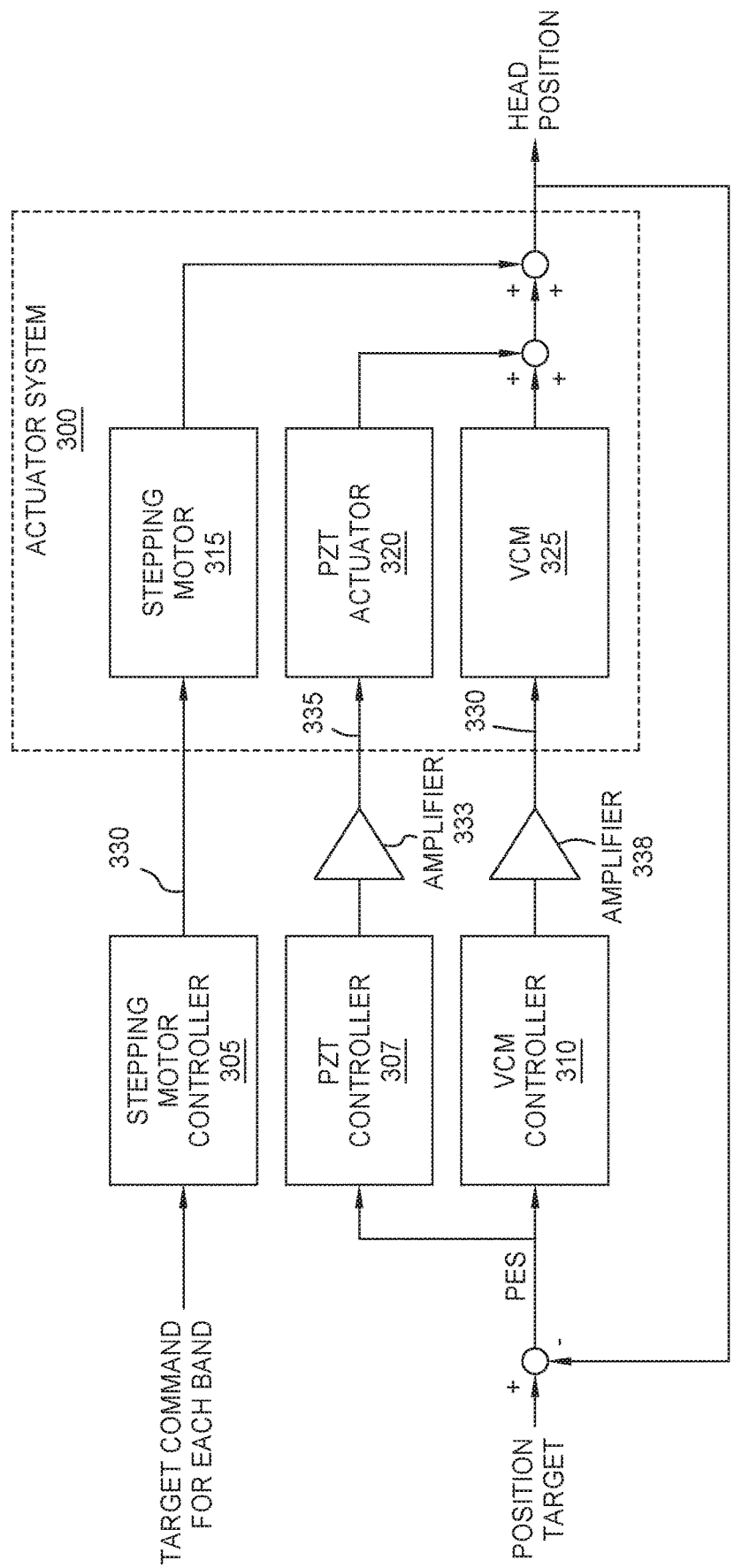
FIG. 3 illustrates a control block diagram for a servo-mechanical system of the tape embedded drive, in accordance with some embodiments.

FIG. 3 illustrates a control block diagram for a servo-mechanical system 300 of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor: VCM:PZT actuator). In other embodiments, the ratios may be different based on the performance specifications of the motors and the actuators.

A first control signal 330 is sent from the stepping motor controller to the stepping motor. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

Figure 4A:
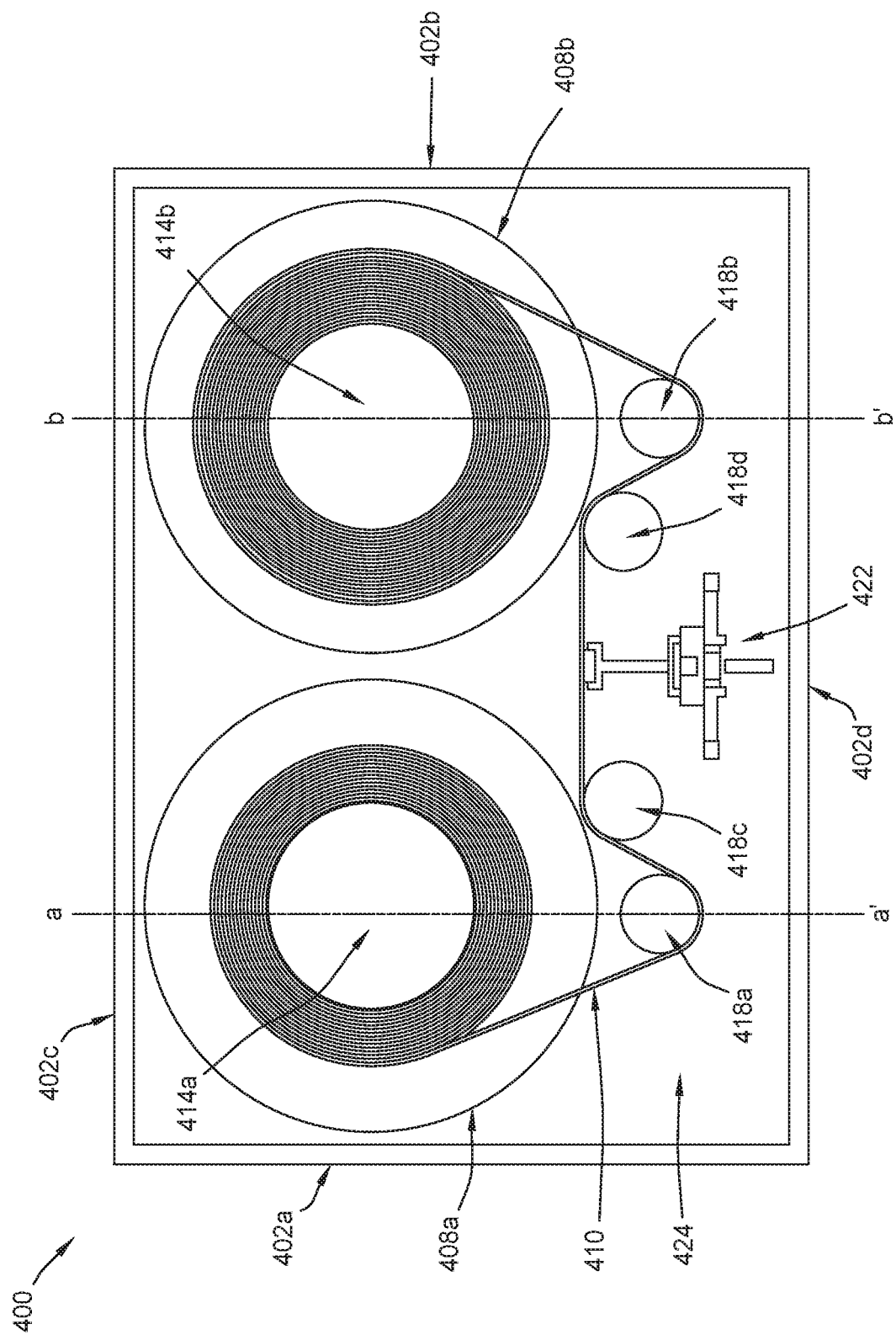
FIGS. 4A, 4B, and 4C are schematic illustrations of spindle shafts disposed within a tape embedded drive enclosure according to various embodiments.
Figure 4B:
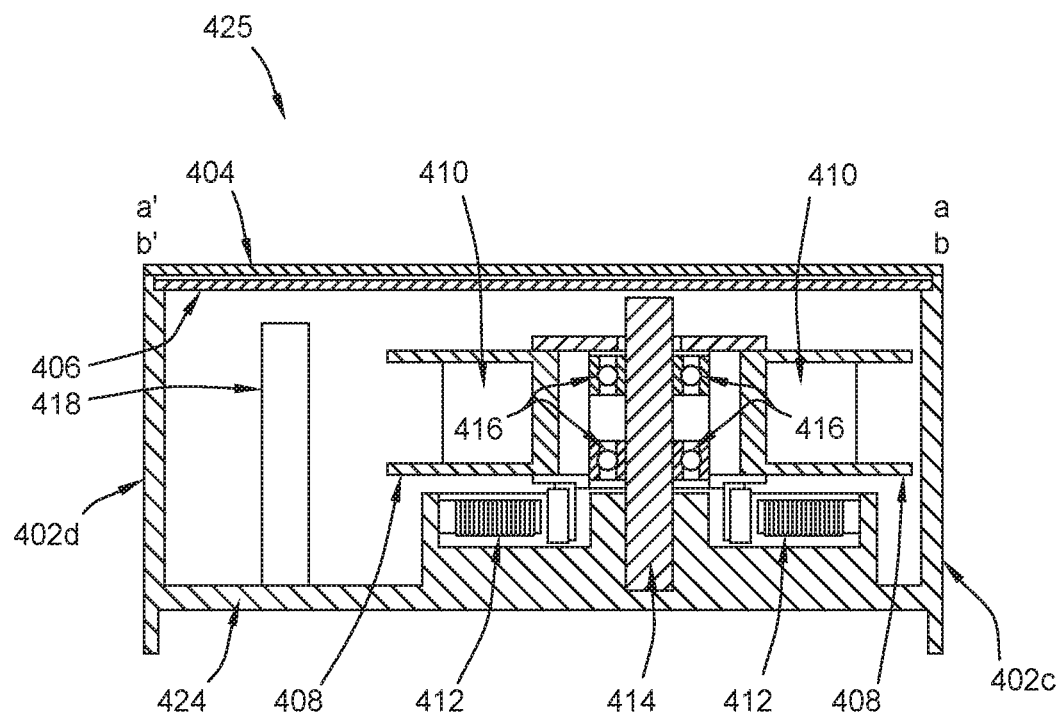
Figure 4C:
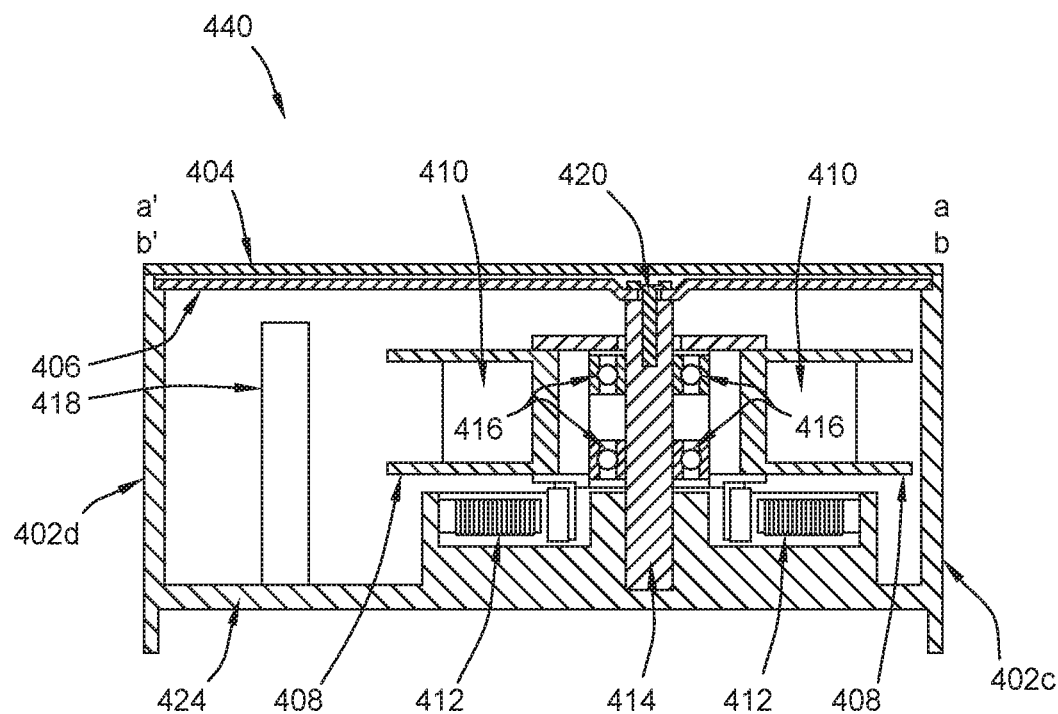

FIGS. 4A, 4B, and 4C are schematic illustrations of spindle shafts disposed within a tape embedded drive enclosure according to various embodiments. FIG. 4A is a top view of a possible embodiment of the tape embedded drive 400 and aspects of the embodiment may be similar to that of the tape embedded drive 100 of FIG. 1.

The tape embedded drive 400 comprises a first wall 402a and a second wall 402b, wherein the first wall 402a and the second wall 402b are parallel and have the same length. An end of the first wall 402a and a respective end of the second wall 402b are connected by a third wall 402c, wherein the third wall 402c is perpendicular to the first wall 402a and the second wall 402b. A fourth wall 402d is perpendicular to both the first wall 402a and the second wall 402b and parallel to the third wall 402c. The fourth wall 402d connects the first wall 402a and the second wall 402b at the opposite end of where the third wall 402c connects the first wall 402a and the second wall 402b. The third wall 402c and the fourth wall 402d are parallel and have the same length, wherein the length of the third wall 402c and the fourth wall 402d is larger than the length of the first wall 402a and the second wall 402b. The first wall 402a, second wall 402b, third wall 402c, and fourth wall 402d are arranged in the configuration above to create an enclosure (referred to as enclosure 402 for the configurations of the walls described above) for the components of the tape embedded drive 400.

The enclosure 402 is attached to a base 424 and comprises a first tape reel 408a, a second tape reel 408b, a tape media 410, a first tape reel spindle shaft 414a coupled to the first tape reel 408a, a second tape reel spindle shaft 414b coupled to the second tape reel 408b, a first roller/guide 418a, a second roller/guide 418b, a third roller/guide 418c, a fourth roller/guide 418d, and a head assembly 422. Certain components of the tape embedded drive 400 may be identical in function to the same components in the tape embedded drive 100 of FIG. 1, such as the tape reels 408a, 408b may be similar to the tape reels 110 of FIG. 1. The tape reel spindle shafts 414a, 414b are a supporting connection unit between the tape reel motors, such as the tape reel motors 140 of FIG. 1, so that the tape reel motors may wind and unwind the tape reels 408a, 408b. The head assembly 422 comprises one or more read/write heads for reading data from and writing data to the tape media 410. In various embodiments, the configuration of the components may differ from the embodiment illustrated.

FIGS. 4B and 4C are cross-section illustrations of the tape embedded drive 400 along the line b-b' or the line a-a' of FIG. 4A, such that the tape reel 408 may either be the tape reel 408a or the tape reel 408b, the tape reel spindle shaft 414 may either be the tape reel spindle shaft 414a or the tape reel spindle shaft 414b, the tape guide 418 may either be the tape guide 418a or the tape guide 418b. Furthermore, the notation "a" or "b" of the previously mentioned components refers to the line that the cross-section illustration of FIGS. 4B and 4C may include, such that the tape guide 418b refers to the line b-b' view of the cross-section. In FIG. 4B, the tape embedded drive 400 further comprises a spindle motor 412 coupled to the base 424. The spindle motor 412 winds/unwinds the tape media 410 around a first tape reel 408a or a second tape reel 408b. The first tape reel 408a is disposed on a first tape reel spindle shaft 414a and the second tape reel 408b is disposed on a second tape reel spindle shaft 414b. Each tape reel spindle shaft 414a, 414b comprises one or more ball bearings 416. The ball bearings 416 aid in reducing the friction of the tape reel spindle shaft 414 and the tape reel 408. In the following descriptions, the tape reel spindle shaft may be referred to as a spindle shaft for simplification and exemplary purposes. The tape embedded drive 425, 450 comprises a first top cover 406 and a second top cover 404, so that the storage device may be sealed to maintain the internal environment of the device.

The first top cover 406 may be disposed on the first wall 402a, the second wall 402b, the third wall 402c, and the fourth wall 402d. Each wall of the enclosure 402 has a ledge, such that the first top cover 406 is disposed on each ledge, so that the first top cover 406 is within the enclosure 402. The second top cover 404 may be situated on top of the walls of the enclosure 402, such that the first top cover 406 is enclosed within the enclosure 402, the base 424, and the second top cover 404.

The distance between the first top cover 406 and the second top cover 404 may not be uniform throughout the area of the first top cover 406, such that one or more recesses for a mechanical coupling in the first top cover 406 may have a larger distance between the first top cover 406 and the second top cover 404 than that of the non-recessed area of the first top cover 406. In one embodiment, the second top cover 404 may have a greater width extending between walls 402c, 402d than the width of the first top cover 406 extending between walls 402c, 402d. The second top cover 404 may be attached to enclosure 402 through various means (i.e., hermetically sealing, welding, etc.), such that the internal environment of the device is isolated from the external environment.

FIGS. 4B and 4C illustrate various embodiments of a fixed spindle shaft 414. In FIG. 4B, the spindle shaft 414 is fixed to the base 424 and is not attached at the opposite end. The base 424 comprises a recess for each of the spindle shafts 414a, 414b. The recess may be sized so that the spindle shaft 414 fits within the recess without room to move or spin. Furthermore, the base 424 may not be uniform in structure, such certain areas may be thicker than others. The thicker areas of the base 424 may house the recess of the base 424, such that the recess has adequate depth to support and stabilize the spindle shaft 414.

However, in FIG. 4C, the spindle shaft 414 is fixed to the base 424 and a first top cover 406. The first top cover 406 may have one or more recesses in which a coupling mechanism, such as a screw 420, attaches the spindle shaft 414 to the top cover 406. The coupling mechanisms, such as the screw 420, may extend through the first top cover 406 and into the spindle shafts 414a, 414b. The coupling mechanism associated with the first top cover 406 provides additional support and stability to the spindle shafts 414 during device read/write operations, as the spindle motors 412 may cause vibrations during operation. The vibrations during operation may cause the one or more read/write heads of the head assembly 422 to become unaligned with the relevant portion of the tape media 410. The one or more recesses may be spaced so that the recess is in line with the one or more recesses of the base 424. The number of recesses of the top cover 406 may match the spindle shafts 414 that the storage device, such as the tape embedded drive 450, may have. Each recess of the top cover 406 may be a certain size, such that the coupling mechanism, such as a screw 420, does not extend above the first top cover 406.

By fixing both ends of the spindle shaft of a tape reel in a tape embedded drive, the tape reel's rotational motion can be more precisely controlled. Additionally, a first cover can be used to effectively fix the top end of the spindle with a coupling device, and a second cover can be used to tightly seal the tape embedded drive.

In one embodiment, a data storage device comprises: an enclosure, the enclosure comprising a first top cover, a base, a first wall, a second wall, a third wall connecting the first wall and the second wall, and a fourth wall connecting the first wall and the second wall, wherein the first wall, the second wall, the third wall, and the fourth wall are all coupled to the first top cover and the base; a first spindle shaft, wherein the first spindle shaft is fixedly coupled to the base and to the first top cover; a first tape reel for unwinding tape media for storing data, wherein the first tape reel is disposed on the first spindle shaft; a head assembly for reading data from and writing data to the tape media, wherein the head assembly is disposed within the enclosure; and a plurality of guide rollers. The data storage device further comprises a second top cover spaced from the first top cover, wherein the second top cover is disposed on top of the first wall, second wall, third wall, and fourth wall such that the first top cover is enclosed within the enclosure, the base, and the second top cover. The data storage device further comprises a second spindle shaft, wherein the second spindle shaft is fixedly coupled to the base and to the first top cover. The data storage device further comprises a second tape reel for unwinding tape media for storing data, wherein the second tape reel is disposed on the second spindle shaft. The first spindle shaft is fixedly coupled to the first top cover with one or more screws. The base comprises a recess therein sized to receive the first spindle shaft. The first top cover comprises an opening for receiving a coupling mechanism for coupling to the first spindle shaft and wherein the first top cover comprises a recess to ensure the coupling mechanism does not extend above the first top cover.

In another embodiment, a data storage device comprises: an enclosure, the enclosure comprising a first top cover, a second top cover, a base, a first wall, a second wall, and a third wall connecting the first wall and the second wall, wherein at least two walls of the first wall, the second wall, and the third wall are coupled to the first top cover, the second top cover, and the base, wherein the second top cover is spaced from the first top cover by a first distance at a first location and by a second distance at a second location, wherein the second distance is greater than the first distance; a first spindle shaft, wherein the first spindle shaft is fixedly coupled to the base; a first tape reel for unwinding tape media for storing data, wherein the first tape reel is disposed on the first spindle shaft; a head assembly for reading data from and writing data to the tape media, wherein the head assembly is disposed within the enclosure; and a plurality of guide rollers. The first top cover comprising at least one recess, wherein the second location is the at least one recess. The at least one recess comprises two recesses. The first top cover has a first width, wherein the second top cover has a second width, and wherein the second width is greater than the first width. The data storage device further comprises a second spindle shaft fixedly coupled to the first top cover. The second top cover hermetically seals the enclosure. The first wall, the second wall, and the third wall each comprises ledges thereon and wherein the first top cover is disposed on the ledges.

In another embodiment, a data storage device comprises: an enclosure, the enclosure comprising a first top cover, a second top cover, a base, a first wall, a second wall, and a third wall connecting the first wall and the second wall, wherein the first wall, the second wall, and the third wall are all coupled to the first top cover, the second top cover, and the base, wherein the second top cover is spaced from the first top cover by a first distance at a first location and by a second distance at a second location, wherein the second distance is greater than the first distance; a first spindle shaft, wherein the first spindle shaft is fixedly coupled to the base and the first top cover; a first tape reel for unwinding tape media for storing data, wherein the first tape reel is disposed on the first spindle shaft; a head assembly for reading data from and writing data to the tape media, wherein the head assembly is disposed within the enclosure; and a plurality of guide rollers. The data storage device further comprises a second spindle shaft, wherein the second spindle shaft is fixedly coupled to the base and the first top cover. The data storage device further comprises a spindle motor coupled to the base. The data storage device further comprises a second tape reel coupled to the second spindle shaft. The first top cover is fixedly coupled to the first spindle shaft using a first coupling mechanism, wherein the first coupling mechanism rests on a top surface of the first top cover, extends through the first top cover, and extends into the first spindle shaft. The first coupling mechanism is spaced from the second top cover.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   an enclosure, the enclosure comprising:
      a first top cover, a base, a first wall, a second wall, a third wall connecting the first wall and the second wall, and a fourth wall connecting the first wall and the second wall, wherein the first wall, the second wall, the third wall, and the fourth wall are all coupled to the first top cover and the base;
   a first spindle shaft, wherein the first spindle shaft is fixedly coupled to the base and to the first top cover, and wherein the first top cover comprises an opening for receiving a coupling mechanism for coupling to the first spindle shaft;
   a first tape reel for unwinding tape media for storing data, wherein the first tape reel is disposed on the first spindle shaft;
   a head assembly for reading data from and writing data to the tape media, wherein the head assembly is disposed within the enclosure; and
   a plurality of guide rollers.

2. The data storage device of claim 1, further comprising:
   a second top cover spaced from the first top cover, wherein the second top cover is disposed on top of the first wall, second wall, third wall, and fourth wall such that the first top cover is enclosed within the enclosure, the base, and the second top cover.

3. The data storage device of claim 1, further comprising a second spindle shaft, wherein the second spindle shaft is fixedly coupled to the base and to the first top cover.

4. The data storage device of claim 3, further comprising:
   a second tape reel for unwinding tape media for storing data, wherein the second tape reel is disposed on the second spindle shaft.

5. The data storage device of claim 1, wherein the first spindle shaft is fixedly coupled to the first top cover with one or more screws.

6. The data storage device of claim 1, wherein the base comprises a recess therein sized to receive the first spindle shaft.

7. The data storage device of claim 1, wherein the first top cover comprises a recess to ensure the coupling mechanism does not extend above the first top cover.

8. A data storage device, comprising:
   an enclosure, the enclosure comprising:
      a first top cover, a second top cover, a base, a first wall, a second wall, and a third wall connecting the first wall and the second wall, wherein at least two walls of the first wall, the second wall, and the third wall are coupled to the first top cover, the second top cover, and the base, wherein the second top cover is spaced from the first top cover by a first distance at a first location and by a second distance at a second location, wherein the second distance is greater than the first distance;
   a first spindle shaft, wherein the first spindle shaft is fixedly coupled to the base;
   a first coupling mechanism extending through the first top cover into the first spindle shaft;
   a first tape reel for unwinding tape media for storing data, wherein the first tape reel is disposed on the first spindle shaft;
   a head assembly for reading data from and writing data to the tape media, wherein the head assembly is disposed within the enclosure; and
   a plurality of guide rollers.

9. The data storage device of claim 8, wherein the first top cover comprises at least one recess, wherein the second location is the at least one recess.

10. The data storage device of claim 9, wherein the at least one recess comprises two recesses.

11. The data storage device of claim 8, wherein the first top cover has a first width, wherein the second top cover has a second width, and wherein the second width is greater than the first width.

12. The data storage device of claim 8, further comprising a second spindle shaft fixedly coupled to the first top cover.

13. The data storage device of claim 8, wherein the second top cover hermetically seals the enclosure.

14. The data storage device of claim 8, wherein the first wall, the second wall, and the third wall each comprises ledges thereon and wherein the first top cover is disposed on the ledges.

15. A data storage device, comprising:
   an enclosure, the enclosure comprising:
      a first top cover, a second top cover, a base, a first wall, a second wall, and a third wall connecting the first wall and the second wall, wherein the first wall, the second wall, and the third wall are all coupled to the first top cover, the second top cover, and the base, wherein the second top cover is spaced from the first top cover by a first distance at a first location and by a second distance at a second location, wherein the second distance is greater than the first distance;
      a first spindle shaft, wherein the first spindle shaft is fixedly coupled to the base and the first top cover;
      a first coupling mechanism extending through the first top cover into the first spindle shaft;
      a first tape reel for unwinding tape media for storing data, wherein the first tape reel is disposed on the first spindle shaft;
      a head assembly for reading data from and writing data to the tape media, wherein the head assembly is disposed within the enclosure; and
      a plurality of guide rollers.

16. The data storage device of claim 15, further comprising a second spindle shaft, wherein the second spindle shaft is fixedly coupled to the base and the first top cover.

17. The data storage device of claim 16, further comprising a spindle motor coupled to the base.

18. The data storage device of claim 17, further comprising a second tape reel coupled to the second spindle shaft.

19. The data storage device of claim 15, wherein the first top cover is fixedly coupled to the first spindle shaft using the first coupling mechanism, wherein the first coupling mechanism rests on a top surface of the first top cover, extends through the first top cover, and extends into the first spindle shaft.

20. The data storage device of claim 19, wherein the first coupling mechanism is spaced from the second top cover.

* * * * *